April 18, 1961 A. V. WEDENSKY 2,980,272
HAMPER RECEIVING AND SQUARING APPARATUS
Original Filed Aug. 7, 1957 6 Sheets-Sheet 1

FIG. 1

INVENTOR
ALEXANDER V. WEDENSKY
BY
ATTORNEY

April 18, 1961 A. V. WEDENSKY 2,980,272
HAMPER RECEIVING AND SQUARING APPARATUS
Original Filed Aug. 7, 1957 6 Sheets-Sheet 2

FIG. 2

INVENTOR
ALEXANDER V. WEDENSKY
BY RJReekJr.
ATTORNEY.

April 18, 1961     A. V. WEDENSKY     2,980,272
HAMPER RECEIVING AND SQUARING APPARATUS
Original Filed Aug. 7, 1957     6 Sheets-Sheet 3

INVENTOR
ALEXANDER V. WEDENSKY.
BY R J Leek Jr
ATTORNEY.

FIG. 11

United States Patent Office 2,980,272
Patented Apr. 18, 1961

2,980,272

HAMPER RECEIVING AND SQUARING APPARATUS

Alexander V. Wedensky, R.F.D. 1, Mountain Springs, N.J.

Original application Aug. 7, 1957, Ser. No. 676,738. Divided and this application Oct. 2, 1958, Ser. No. 768,820

6 Claims. (Cl. 214—307)

The present invention relates to apparatus for the manufacture of incandescent lamps and, more particularly, to apparatus for receiving and squaring a hamper of incandescent lamp bulbs, which apparatus is then movable to deliver the lamp bulbs to a bulb magazine.

An incandescent lamp bulb has a generally spherical body portion and a cylindrical neck portion of smaller diameter. The bulbs are usually packed in cartons or hampers in individual layers separated by cardboard sheets. Each layer of bulbs is arranged in a plurality of rows or columns of alternately inverted bulbs so that each "neck-up" bulb, for example, is surrounded by four "body-up" bulbs. This packing arrangement provides a maximum number of bulbs in a minimum amount of hamper space.

Heretofore the bulbs have either been manually fed directly to the feeding machine or manually fed to a semi-automatic bulb feeder such as shown in U.S. Patent No. 1,783,806, issued December 2, 1930, to W. W. Loebe et al. There is no provision in bulb feeding apparatus of this type for the unloading of the bulbs from the hamper or for orienting of the bulbs after unloading in the desired "neck-down" position as is required for delivery to the sealing machine for fabrication of the bulbs into completed incandescent lamps. Further, there is considerable handling of the fragile glass bulbs in the transfer of the bulbs from the hamper to the loading chutes of such bulb feeders. This handling results in considerable shrinkage of material due to breakage of the bulbs. In addition, such a bulb feeder is not positive enough or fast enough in the feeding of bulbs for present high speed sealing machines.

The present invention contemplates the provision of a hamper receiving and squaring mechanism for delivering the squared hamper to a bulb magazine provided with an elevating platform.

It is accordingly the general object of the invention to provide apparatus for receiving a hamper of bulbous articles arranged in alternate "neck-down"—"neck-up" order, for squaring the hamper and for transferring the articles into an article receiving magazine.

Still further objects of the present invention will become apparent to those skilled in the art by reference to the accompanying drawings in which.

Although the principles of the invention are broadly applicable to the unloading, orienting and feeding of bulbous articles, the invention is particularly adapted for use in conjunction with the unloading, orienting and feeding of incandescent lamp bulbs and hence has been so illustrated and will be so described.

Figure 1:
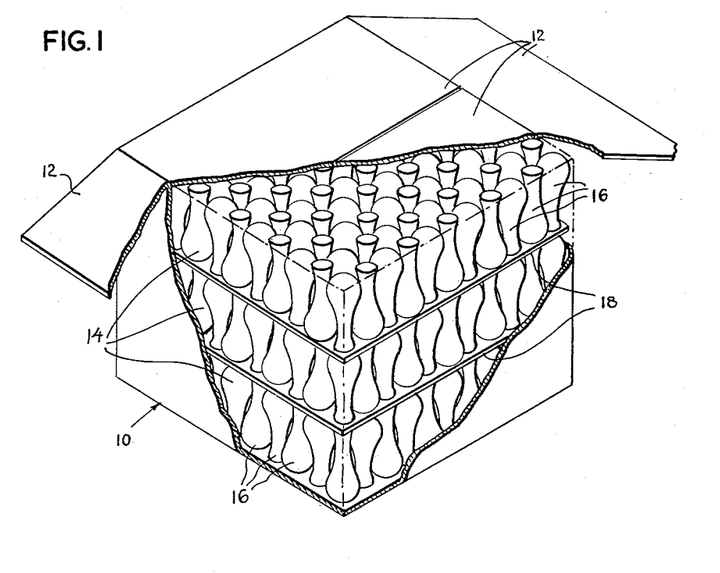
Fig. 1 is a perspective view of a hamper, partially broken away to show a plurality of layers of bulbous articles, such as incandescent lamp bulbs, which layers have a plurality of rows of alternate "neck-up" and "neck-down" bulbs.

With specific reference to the form of the invention illustrated in the drawings an incandescent lamp bulb hamper or carton 10 is shown in Fig. 1 having top flaps 12 and containing a plurality of layers 14, for example 3 in the present showing of Fig. 1, of incandescent lamp bulbs 16. Each of the layers 14 is spaced from the adjacent lower layer by a spacing sheet 18, suitably cardboard and comprises rows or columns of the bulbs 16 arranged in alternate "neck-down" and "neck-up" order, so that a maximum number of bulbs 16, suitably one hundred twenty-one, may be contained within a given layer 14.

It will be understood from a consideration of Fig. 1 that the bulbs 16 have a generally spherical body portion and a generally cylindrical neck portion of a smaller diameter than the body portion, which neck portions are provided with a culleted or flared bottom. Thus, when the bulbs 16 are arranged in the above mentioned alternating order a substantial space, shown particularly in Fig. 2, exists between the mid-portions of adjacent rows of bulbs 16 for the insertion therein of a threading member (not shown).

A hamper 10 loaded with bulbs 16 and having its top flaps 12 folded down, may be fed by hand or by a conveyor 20 (Fig. 2) to a hamper receiving, squaring and inverting mechanism 24. As shown particularly in Fig. 2 the conveyor 20 consists of a plurality of rollers 28 pivoted in longitudinal channels 30, which channels 30 are supported by legs 32 upstanding from a bed-plate 34 of apparatus for unloading the bulbs 16 form the hamper 10, orienting the bulbs 16 in the "neck-down" position and feeding the oriented bulbs 16 to an article receiving means, such as a sealing machine (not shown).

*Hamper receiving, squaring and inverting mechanism*

Figure 2:
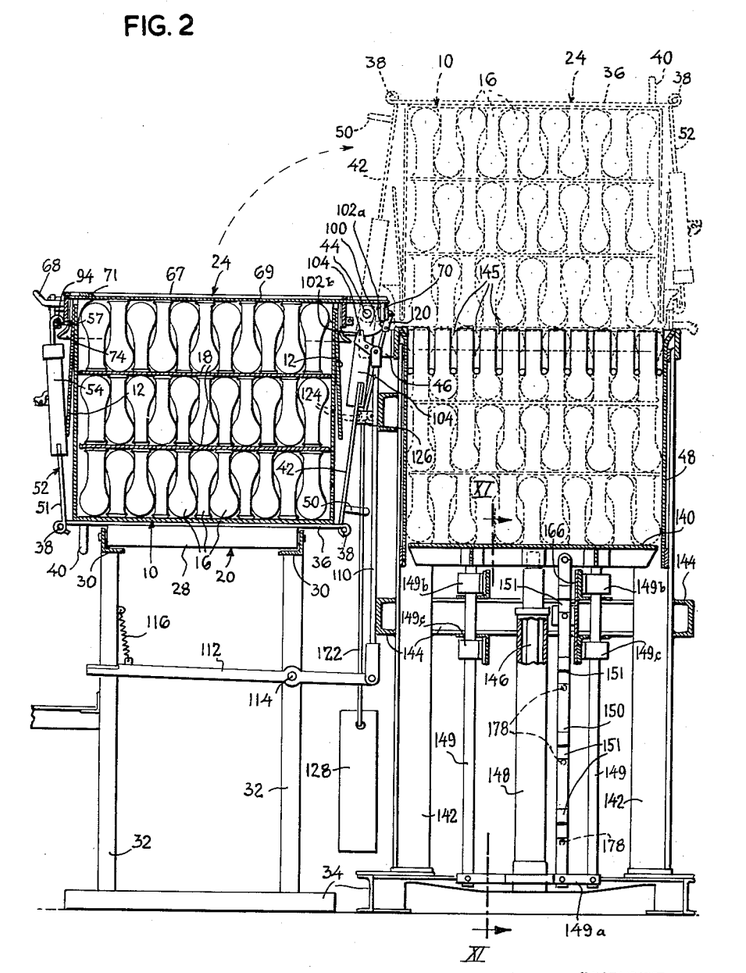
Fig. 2 is a vertical sectional view of the hamper receiving, squaring and inverting mechanism, the bulb magazine, elevating platform and reciprocating mechanism for the elevating platform.
Figures 4, 9, 10:
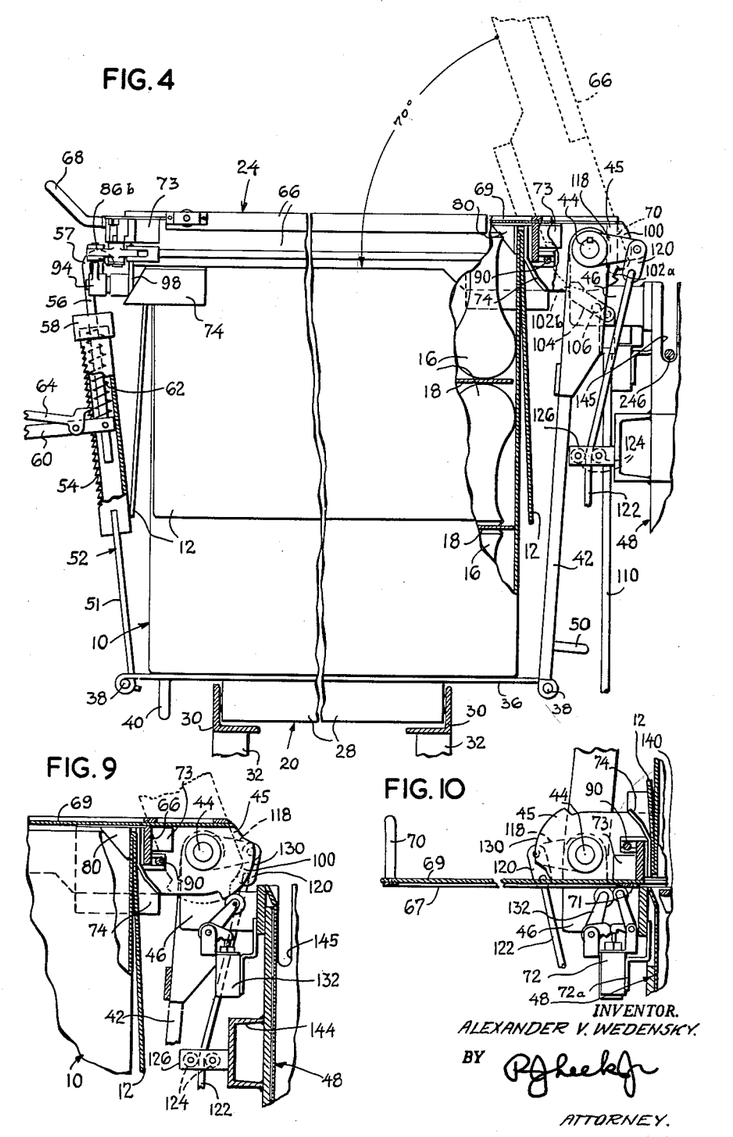
Fig. 4 is a side elevational view of the hamper receiving, squaring and inverting mechanism, with the hamper squaring device in the operating position and having a portion of the hamper broken away to show the details of said hamper squaring device.
Fig. 9 is an enlarged vertical sectional view of the hamper squaring device along the line IX—IX of Fig. 3 in the direction of the arrows and showing a cam and a switch for actuating the reciprocating mechanism for the elevating platform of the bulb magazine.
Fig. 10 is a vertical sectional view, similar to Fig. 9, along the line X—X of Fig. 3 in the direction of the arrows and showing the hamper in an inverted position on the elevating platform and another switch and cam for actuating the lowering of the reciprocating mechanism for the elevating platform of the bulb magazine.

The hamper receiving, squaring and inverting mechanism 24 (Figs. 2, 4 and 12 through 19) has a plurality of bottom bands or slats 36, for example four, only one of which slats 36 is shown in Figs. 2 and 4, disposed between adjacent rollers 28 on the delivery end of the conveyor 20. To provide means for integrating the bottom slats 36 horizontal rods 38 extend through the outer hub portions, as viewed in Figs. 2 and 4, of the bottom slats 36, one of which slats 36 is provided with a handle 40 for inverting the hamper receiving, squaring and inverting mechanism 24. One side of the mechanism 24 comprises a pair of angularly extending side bands or slats 42 which are limited pivotably in a clockwise direction, as viewed in Figs. 2 and 4, on the right hand rod 38. These angular bands 42 have their upper ends secured around a pair of stud shafts 44 journalled in brackets 46 affixed to the adjacent side wall of a bulb storing means or bulb magazine 48. One of the angular side bands 42 is provided with an operating handle 50, Fig. 2, for returning the emptied hamper receiving, squaring and inverting mechanism 24 from its inverted position on the bulb magazine 48 (Fig. 2) to its initial position.

The other side member of the mechanism 24 is a resilient side band 52 provided with a bottom rod 51 (Figs. 2 and 4) which is limitedly pivotable in a counterclockwise direction on the left hand rod 38. This side band 52 comprises a hollow ratchet 54 affixed to the upper portion, as viewed in Fig. 2, of the rod 51 and also to an upper rod 56 (Fig. 4) provided with a hooked upper end 57 (Fig. 4) slidable in an end cap 58 of the ratchet 54. By reference particularly to Fig. 4, it will be noted that the lower portion of the rod 56 is pinned to a ratchet handle 60 which is slidable in a longitudinal slot in the ratchet 54. To bias the handle 60 and the lower end of the rod 56 away from the cap 58, a compression spring 62 is provided on the rod 56 between the handle 60 and the cap 58. For the purpose of locking the handle 60 in a desired position, a pawl 64 pivoted on the handle 60, normally engages the toothed portions of the ratchet 54.

Figure 3:
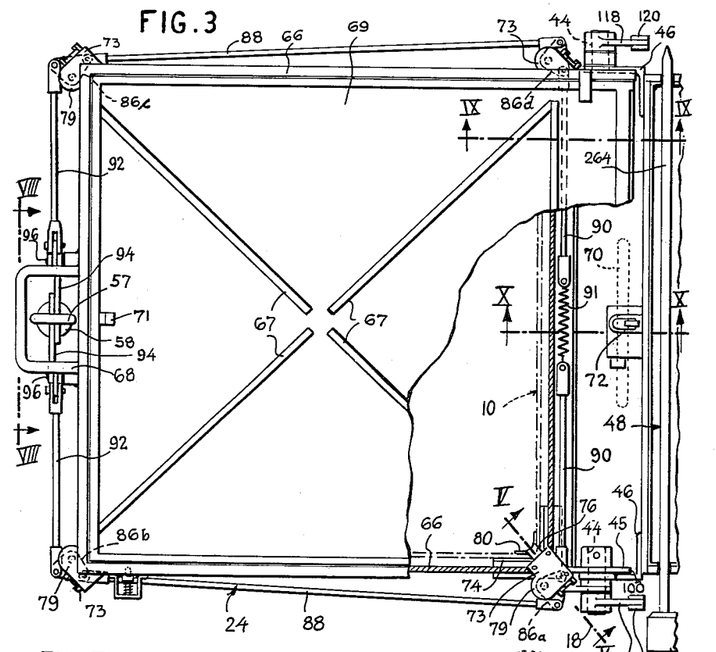
Fig. 3 is a plan view of the pivotable hamper receiving, squaring and inverting mechanism with a portion of the cover frame broken away to show the details of the hamper squaring device.

A cover frame 66 of the hamper receiving, squaring and inverting mechanism 24, suitably of general picture frame construction, is pivoted on the stud shafts 44 by means of hinges 45 and is provided with a handle 68 on the left hand end, as viewed in Figs. 3 and 4. To provide article retaining means within the cover frame 66, a slide 69 (Figs. 2, 4, 10 and 18), essentially a flat plate provided with diagonal reinforcing ribs 67 (Fig. 3) is contained in a suitable recess in the cover frame 66. The slide 69 is provided with a handle 70 (Fig. 2) and carries a depending cam 71 (Figs. 2 and 3). When the hamper receiving, squaring and inverting mechanism 24 is in the inverted position shown in Fig. 2 withdrawal of the slide 69 from the cover frame 66 causes the cam 71 to operate and close a normally open double-throw switch 72 (Figs. 3, 10 and 18) mounted on a bracket 72a (Fig. 10) secured to the adjacent side wall of the bulb magazine 48, thus actuating a work circuit as hereinafter related. The cover frame 66 carries a hamper squaring device for stretching and squaring the four corners of the hamper 10.

*Hamper squaring device*

Figures 5, 6, 7, 8:
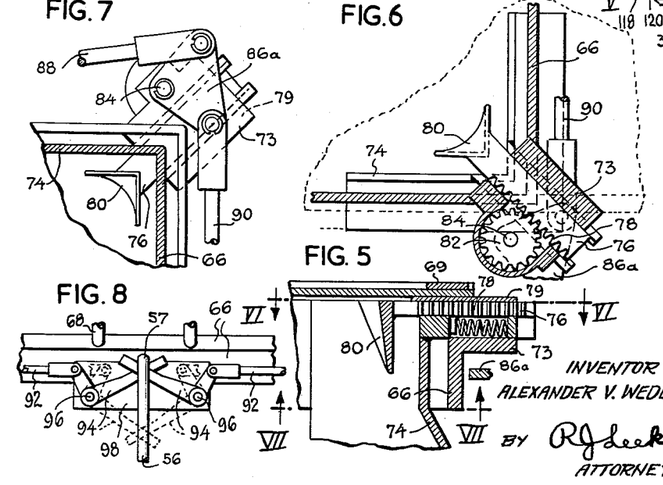
Fig. 5 is a fragmentary vertical sectional view of a portion of the hamper squaring device along the line V—V of Fig. 3 in the direction of the arrows.
Fig. 6 is a horizontal sectional view of the hamper squaring device along the line VI—VI of Fig. 5 in the direction of the arrows.
Fig. 7 is a horizontal sectional view of the hamper squaring device along the line VII—VII of Fig. 5 in the direction of the arrows.
Fig. 8 is an end elevational view of the actuating means for the hamper squaring device along the line VIII—VIII of Fig. 3 in the direction of the arrows.

Each corner of the cover frame 66 supports a diagonally disposed guide bracket 73 (Figs. 3 and 5–7) from which depends a stationary anvil 74 with the latter being provided with an outwardly flared lower portion, as viewed in Fig. 5, for guiding the corners formed by the side walls and bend down top flaps 12 of the carton or hamper 10 into the squaring position. To provide corner stretching means for the device 24 a slide 76 having a rack 78 in one side wall thereof and a stretcher 80 on its inner operating end, as viewed in Figs. 6 and 7, is reciprocable in the guide bracket 73 and retained therein by a cover plate 79. The rack 78 meshes with a gear 82 affixed to a shaft 84 depending, as viewed in Fig. 6, from the bracket 73. Rotation of the gear 82 moves the rack 78 diagonally outward from the center of the cover frame 66 to compress an adjacent corner of the hamper 10 between the stretcher 80 and the anvil 74. To achieve the desired rotation of the gear 82, a rear triangular shaped connecting plate 86a, as viewed in Fig. 3, is secured to one of the rear shafts 84 and is joined by a side connecting rod 88 to a similarly mounted front connecting plate 86b shown in dotted lines in Fig. 3. In like manner the rear connecting plates 86a and 86d, as viewed in Fig. 3, are connected together by rods 90 biased by a compression spring 91 to normally urge and maintain the stretchers 80 in the open position, which position for one of the stretchers 80 is shown in Fig. 6. Each of the left hand connecting plates 86b, 86c, as viewed in Fig. 3 is connected by a rod 92 to a bell crank lever 94 suitably pivoted on stud shafts 96 extending laterally to the left, as viewed in Fig. 3, from a plate 98 (Fig. 8) depending from the cover frame 66. The inner crossed ends of the levers 94, as viewed in Fig. 8, are engageable by the hooked end 57 of the rod 56 to secure the hamper receiving, squaring and inverting mechanism 24 about the hamper 10 and also to actuate the hamper stretching device. For maintaining the cover frame 66 in the dotted line raised position of Fig. 4, approximately 70° from the solid line position of the cover frame 66 shown in Fig. 4, and in the normal horizontal hamper engaging position shown in the solid lines of Figs. 2–4 and 13, the forward hinge 45, as viewed in Fig. 3, of the cover frame 66 carries a locking cam 100 (Figs. 3, 4). Accordingly, the outer cam surface of the hinge 100 is provided with a pair of notches 102a, 102b, which notches are engageable by a locking lever 104 (Figs. 2 and 4) pivotable on a horizontal stud shaft 106 affixed by means of the bracket 46 to the adjacent side wall of the bulb magazine 48. The lower end of the lever 104 is joined by a connecting rod 110 (Figs. 2 and 4) to a lever 112 (Fig. 2) pivoted at 114 on one of the legs 32 of the conveyor 20. The operating end of the lever 112 extends beyond the adjacent left hand leg 32, as viewed in Fig. 4, and is held in the normally "up," or cover frame locking position, by a spring 116 secured to the adjacent left hand leg 32, of the conveyor 20 and is engageable by the operator's foot.

For the purpose of providing counterweighting means for the cover frame 66, an arm 118 (Figs. 3 and 4) is affixed to each of the stud shafts 44. The outer end, as viewed in Figs. 5 and 6, of each of these arms 118 is connected by means of a link 120 to a rope 122 guidable in rollers 124 (Figs. 2 and 4) secured in a bracket 126 affixed to the adjacent side wall of the bulb magazine 48, which rope 122 carries a suitable counterweight 128 on the lower end (Fig. 2).

Operation of the hamper squaring device

Figure 13:
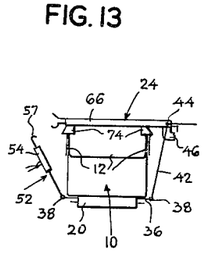
Fig. 13 is a view similar to Fig. 12 and showing the pivotable cover frame of the hamper receiving, squaring and inverting mechanism in engagement with the open end of the hamper, before the squaring operation.
Figure 14:
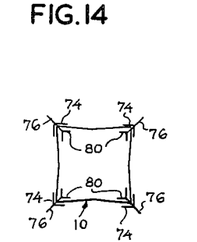
Fig. 14 is a diagrammatic plan view of the hamper and the hamper receiving, squaring and inverting mechanism of Fig. 13.
Figure 15:
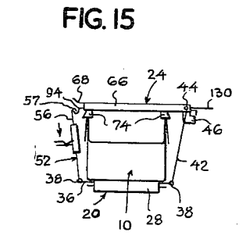
Fig. 15 is a view similar to Fig. 13 and showing the actuating means of the hamper squaring device in engagement with the cover frame of the hamper receiving, squaring and inverting mechanism and ready for hamper squaring and inverting operation.
Figure 16:
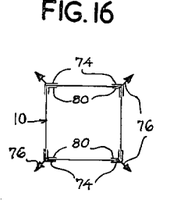
Fig. 16 is a view similar to Fig. 14 and showing the squared hamper and hamper squaring device after the hamper squaring operation.

At the beginning of this work cycle the counterweighted cover frame 66 is retained in its "up" position (Figs. 4 and 12) by the engagement of the locking lever 104 in the notch 102a in the hinge cam 100. The conveyor 20 then delivers a hamper 10 (Fig. 12), against a stop (not shown) on one of the longitudinal channels 30 of the conveyor 20 and in registry with the bottom slats 36 of the hamper receiving, squaring and inverting device 24. The operator depresses the lever 112 with her foot, thus removing the locking lever 104 from the notch 102a and moves the cover frame 66 by means of the handle 68 in a counterclockwise direction, as viewed in Figs. 4 and 12, so that the anvils 74 at each of the four corners of the cover frame 66 move the top flaps 12 downwardly to position the four corners of the hamper 10 between the anvils 74 and the adjacent stretchers 80 (Figs. 13, 14). Release of the foot lever 112 then seats the lever 104 in the notch 102b and locks the cover frame 66 in the position shown in the solid lines of Figs. 2, 4 and 14. By squeezing the pawl 64 against the handle 60 of the resilient side band 52 the operator releases the pawl 64 from engagement with the ratchet 54 and is able to move the hooked end 57 of the rod 56 upwardly, as viewed in Fig. 4, to hook the end 57 over the overlapping crossed operating ends of the bell crank levers 94 (Fig. 15). Pushing downwardly, as viewed in Figs. 4 and 8, on the handle 60, the operator moves the operating ends of the levers 94 downwardly, as viewed in Fig. 8, along the side of the hamper 10 from the solid line position to the dotted line position shown in Fig. 8. This movement of the levers 94 causes the connecting rods 92 to move inwardly toward the hooked end 57 and rotates the connecting plates 86b and 86c in a clockwise and counterclockwise direction respectively, as viewed in Fig. 3, which movement of the plates 86b and 86c moves the side rods 88 to the left. In turn the connecting plates 86a, 86d are similarly rotated in a clockwise and counterclockwise direction respectively, as viewed in Fig. 3, by the movement of the rods 88.

Rotation of the connecting plates 86a, 86b, 86c and 86d move their respective gears 82 (Figs. 5 and 6) in a similar direction, thus causing the individual racks 78, slides 72 and the stretchers 80 to move diagonally outward, as viewed in Figs. 3 and 14, from the center of the hamper 10 and to squeeze the upper corners of the hamper 10 against their respective anvils 74 (Fig. 16) thus squaring the hamper 10. When sufficient pressure has been exerted by the operator to square the corners of the hamper 10, the operator releases her grip on the pawl 64, which pawl 64 engages the ratchet 54, thus locking the squared hamper 10 in position for its inverting transfer from the conveyor 20 to the bulb magazine 48, which transfer is accomplished by the operator by means of the handle 40 (Fig. 2).

During this transfer (Figs. 2, 4 and 17) of the hamper receiving, squaring mechanism 24, a cam 130 affixed to the rear hinge 45, as viewed in Fig 9, closes a normally open micro-switch 132 mounted on the side wall of the bulb magazine 48 and actuates a reciprocating mechanism for raising an article supporting means, or elevating platform 140 (Fig. 2) which platform 140 is reciprocable within the bulb magazine 48.

Bulb magazine

The bulb magazine 48 (Figs. 2 and 17 through 19) is an open ended box mounted on four legs 142 upstanding from a portion of the bed-plate 34, which legs 142 are integrated by a plurality of horizontal tie members 144. The upper edge of the bulb magazine 48 is suitably beveled to guide the layered bulbs 16 thereinto during the transfer of the bulbs 16, as hereinafter related, from the inverted hamper receiving, squaring and stretching mechanism 24 to the bulb magazine 48. In addition, the upper portions of the front and rear side walls, as viewed in Fig. 2, of the bulb magazine 48 are provided with spaced longitudinal threading slots 145, for use as later related.

Raising of the elevating platform

Figure 11:
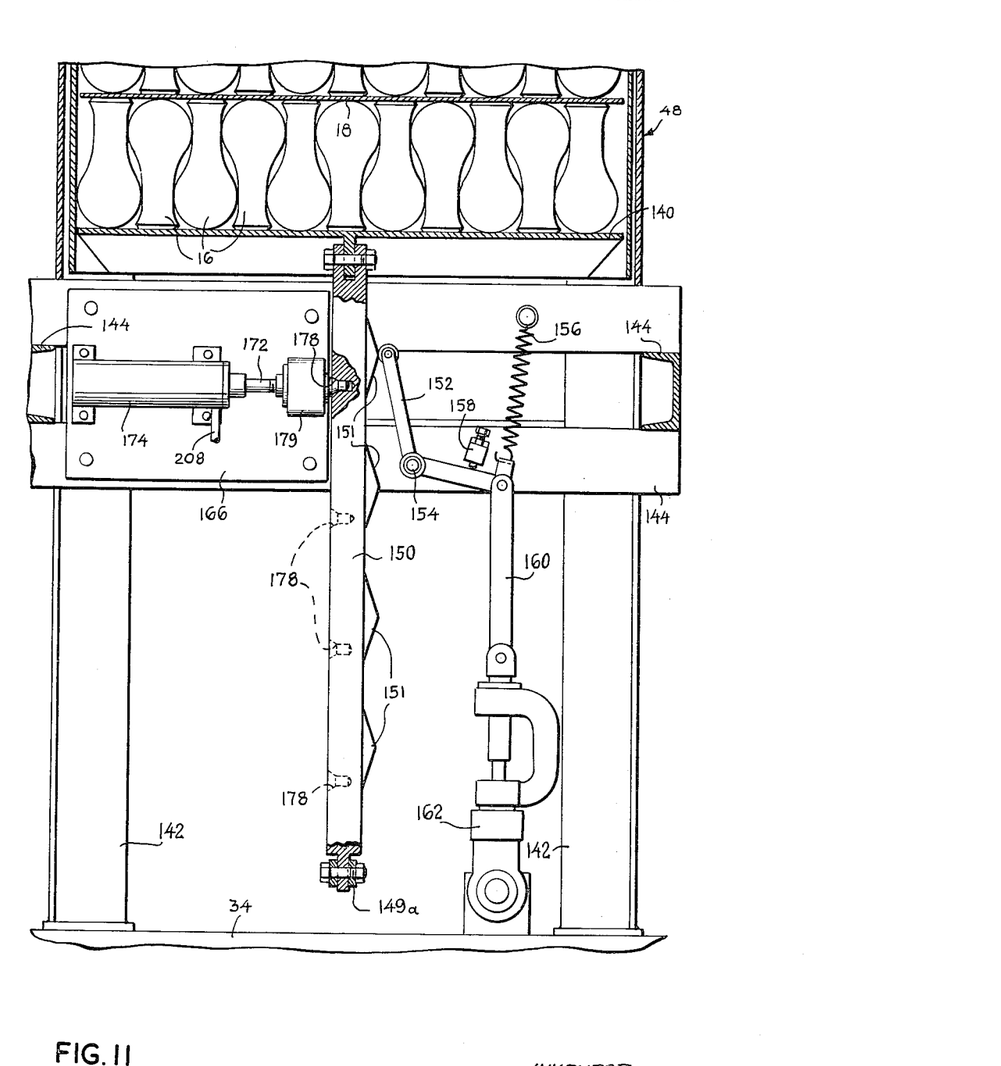
Fig. 11 is an enlarged fragmentary vertical sectional view of the reciprocating mechanism for the elevating platform of the bulb magazine along the line XI—XI of Fig. 2 in the direction of the arrows and showing the reciprocating mechanism in its lowermost position.
Figure 12:
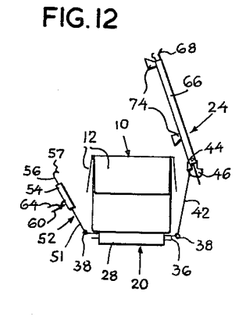
Fig. 12 is a diagrammatic side elevational view of the hamper receiving, squaring and inverting mechanism in the hamper receiving position.

The elevating platform 140 is mounted on a piston rod 146 (Figs. 2 and 17 through 19) of an air cylinder 148 upstanding from the bed-plate 34, which cylinder 148 is the prime mover for the reciprocating mechanism for the elevating platform 140. To provide smooth movement of the elevating platform 140, the platform is affixed to mount rods 149 (Fig. 2) integrated at the bottom by a plate 149a, which rods 149 reciprocate in top bearings 149b and bottom bearings 149c secured to a channel iron tie 144. In addition, a vertical retarding cam 150 (Fig. 2) having generally tapered spaced raised portions 151 (Fig. 11) is suspended from the elevating platform 140 and has its lower portion as viewed in Fig. 2, connected to a plate 149a. As shown in Fig. 11, a bell crank lever 152 is pivoted at 154 on one of the lower horizontal ties 144 and has its roller carrying end biased by means of a spring 156 into engagement with the retarding cam 150. To limit the clockwise rotation, as viewed in Fig. 11, of the lever 152, a stop 158 (Fig. 11) is mounted on the tie 144. The lower end of this lever 152 is connected by a link 160 to a reducing valve 162 mounted on the bed-plate 34, which valve 162 is opened wide and partially closed by the above described linkage and the cam 150. For the purpose of locking the elevating platform 140 in a desired elevated position, a piston rod 172 (Fig. 11) of an air cylinder 174 mounted on a vertical plate 166 secured to the tie 144, is normally biased by means of a spring (not shown) into engagement with one of a plurality of spaced piston receiving apertures 178 provided with the left hand side wall, as viewed in Fig. 11 of the cam 150. To provide the required rigidity to this locking device the extended piston rod 172 (Fig. 11) reciprocates in a bearing 179 mounted on the plate 166 between the air cylinder 174 and the cam 150.

Figure 17:
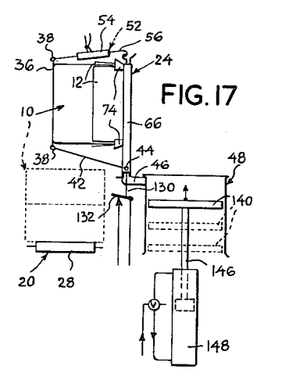
Fig. 17 is a diagrammatic side elevational view of the pivotable hamper receiving, squaring and inverting mechanism, the bulb magazine, the elevating platform, and the reciprocating mechanism for the elevating platform and showing the hamper receiving, squaring and inverting mechanism in the position for actuating the reciprocating mechanism for the elevating platform.

Closure of the switch 132 by the cam 130 carried by the magazine 48 when the hamper receiving, squaring and inverting mechanism 24 is in the position shown in Fig. 17, closes a circuit (not shown), thus admitting compressed air to the air cylinder 174, which air moves the piston rod 172 to the left, as viewed in Fig. 11, and out of the locking aperture 178 in the cam 150, as above mentioned.

Figure 18:
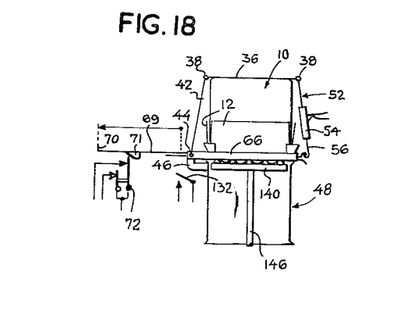
Fig. 18 is a diagrammatic side elevational view of the hamper and hamper receiving, squaring and inverting mechanism in the inverted position on the bulb magazine and showing the withdrawal of a retractable slide in the cover frame of the hamper receiving, squaring and inverting mechanism, to actuate the reciprocating mechanism for the elevating platform and the lowering of the elevating platform.

Thus, when the piston rod 172 of the air cylinder 174 is withdrawn from the locking aperture 178 in the cam 150, the piston rod 146 and the elevating platform 140 are moved slowly upward, as viewed in Figs. 11 and 17, by the slight constant air pressure flowing through the reducing valve 162 and entering the bottom, as viewed in Fig. 2, of the air cylinder 148. However, as the roller carrying end of the lever 152 rides down the inclined portion 151 of the cam 150, the valve 162 opens wide to increase the air pressure supplied to the cylinder 148 and the elevating platform is thus elevated rapidly to engage the descending cover frame 66 of the inverted hamper receiving, squaring and inverting mechanism 24 about to be supported by the bulb magazine 48, as shown in Figs. 17 and 18.

As the elevating platform 140 approaches the top of its travel and as the hamper receiving, squaring and inverting mechanism 24 nears the end of its inverting swing, the cam 100 on such mechanism 24 (Fig. 9) opens the switch 132, thus deenergizing the above mentioned circuit (not shown) with the result that the piston rod 172 is then urged by the spring 176, as viewed in Fig. 11, into engagement with the lowermost locking aperture 178 in the cam 150 which thus locks the elevating platform 140 in its "up" position (Fig. 18), in preparation for the removal of the slide 69 from the cover frame 66.

*Removal of the slide*

The removal of the slide 69 (Fig. 18, 19) causes the cam 71 carried thereby to close the contacts of double-throw switch 72 affixed to the magazine 48 which switch 72 controls a second "unlocking" circuit (not shown) for causing the release of the cam 150 and a "lowering" circuit (not shown) for causing the lowering of the platform 140 to transfer the bulbs 16 from the mechanism 24 to the bulb magazine 48.

*Insertion of cover slide*

Figure 19:
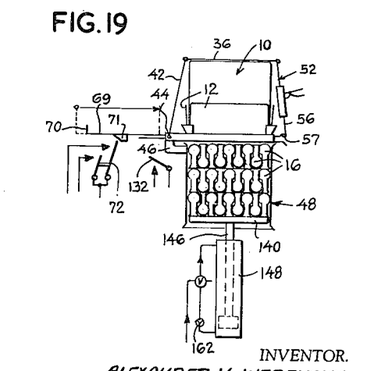
Fig. 19 is a view similar to Fig. 18 and showing the return of the slide within the cover frame of the hamper receiving, squaring and inverting mechanism after the lowering of the elevating platform by the reciprocating mechanism, preparatory for the inversion of the now empty hamper receiving, squaring and inverting mechanism to its starting position.

When the elevating platform 140 reaches the lowermost position shown in Fig. 19, the operator pushes the handle 70 and the slide 69 to the right and thus to its former position within the aperture in the cover frame 66. This movement of the slide 69 and the cam 71 carried thereby, opens the double throw switch 72, thus deenergizing the above described second "unlocking" circuit (not shown) and "lowering" circuit (not shown) for the elevating platform 140.

The operator then grasps the handle 50 on the side plate 42 and rotates the now empty hamper 10 and the hamper receiving, squaring and inverting mechanism 24 counterclockwise to its initial position shown in Figs. 2 and 15 on the delivery end of the conveyor 20. Squeezing the pawl 64 against the handle 60, the operator releases the pawl 64 from the ratchet 54, and moves the handle 60 upwardly (Fig. 2) to release the hooked end 57 of the rod 56 from the crossed operating ends of the levers 94 of the hamper squaring device. The levers 94, urged by the spring 91 between the rods 90 move inwardly, as viewed in Fig. 8, from the dotted position to the solid position, thus rotating the hamper squaring device and causing the stretchers 80 to move away from their respective anvils 74 to release the now empty hamper 10 from the hamper squaring device. The operator then releases the lever 104 from the notch 102b (Fig. 4) and raises and locks the counterweighted cover frame 66, in dotted line position shown in Fig. 4 and the solid line position shown in Fig. 12, and removes the empty hamper 10 by the conveyor 20.

Thus, it will be seen from the foregoing description that the objects of the invention have been achieved by providing apparatus for receiving a hamper 10 of lamp bulbs 16 arranged in alternate "neck-down" "neck-up" order, for squaring and inverting the hamper 10 and for transferring the bulbs 16 into an article receiving magazine 48. The apparatus eliminates the handling of fragile lamp bulbs 16 during the transfer of said bulbs from a hamper 10 to the sealing machine.

Although a specific embodiment of the present invention has been herein shown and described, it is to be understood that other modifications thereof may be made without departing from the scope of the present invention.

I claim:

1. Apparatus for receiving and squaring a box-like carton having an open end, said apparatus comprising a bottom support member for receiving and supporting said carton with its open end opposite to such bottom support member, a side member and a resilient clamping member pivoted on said bottom support member, a cover frame member pivoted on said side member, said side member and said resilient clamping member and said cover frame member being movable to an open position to permit reception of said carton on said bottom support member, said cover frame member being thereafter movable into engagement with the open-end of said carton, a plurality of anvils on said cover frame member, one for each corner of the open end of said carton, a stretcher on said cover frame member adjacent each of said anvils and movable with respect to its associated anvil, each of said anvils and its associated stretcher being positioned on the outside and the inside respectively of a corner of said open end when said cover frame member engages said open end, coupling means on said cover frame member, and operating means connecting said stretchers to each other and to said coupling means, said resilient clamping member being movable into engagement with said coupling means when said cover frame member is in engagement with said open end to clamp said carton between said bottom support member and said cover frame member and to cause said stretchers to move said corners toward said anvils thereby stretching and squaring the clamped carton.

2. Apparatus for receiving and squaring a box-like carton having an open end, said apparatus comprising a bottom support member for receiving and supporting said carton with its open end opposite to such bottom support member, a side member and a resilient clamping member pivoted on said bottom support member, a cover frame member pivoted on said side member, said side member and said resilient clamping member and said cover frame member being movable to an open position to permit reception of said carton on said bottom support member, said cover frame member being thereafter movable into engagement with the open-end of said carton, a plurality of anvils on said cover frame member, one for each corner of the open end of said carton, a stretcher on said cover frame member adjacent each of said anvils and movable with respect to its associated anvil, each of said anvils and its associated stretcher being positioned on the outside and the inside respectively of a corner of said open end when said cover frame member engages said open end, coupling means on said cover frame member, operating means connecting said stretchers to each other and to said coupling means, and biasing means connected to said stretchers for biasing said stretchers away from said anvils, said resilient clamping member being movable into engagement with said coupling means when said cover frame member is in engagement with said open end to clamp said carton between said bottom support member and said cover frame member and to cause said stretchers to move said corners toward said anvils against the action of said biasing means thereby stretching and squaring the clamped carton.

3. Apparatus for receiving and squaring a box-like carton having an open end, said apparatus comprising a bottom support member for receiving and supporting said carton with its open end opposite to such bottom support member, a side member and a resilient clamping member pivoted on said bottom support member, a cover frame member pivoted on said side member, said side member and said resilient clamping member and said cover frame member being movable to an open position to permit reception of said carton on said bottom support member, said cover frame member being thereafter movable into engagement with the open-end of said carton, a plurality of anvils on said cover frame member, one for each corner of the open end of said carton, a stretcher on said cover frame member adjacent each of said anvils and movable with respect to its associated anvil, each of said anvils and its associated stretcher being positioned on the outside and the inside respectively of a corner of said open end when said cover frame member engages said open end, coupling means on said cover frame member, operating means connecting said stretchers to each other and to said coupling means, said resilient clamping member being movable into engagement with said coupling means when said cover frame member is in engagement with said open end to clamp said carton between said bottom support member and said cover frame member and to cause said stretchers to move said corners toward said anvils thereby stretching and squaring the clamped carton, and locking means on said resilient clamping member for locking the latter in the clamping position.

4. Apparatus for receiving and squaring a box-like carton having an open end while such apparatus is in a carton-receiving position, said apparatus comprising a frame, a bottom support member for receiving and supporting said carton with its open end opposite to such bottom support member, a side member and a resilient clamping member pivoted on said bottom support member, a cover frame member having a common pivot with said side member on said frame, said side member and said resilient clamping member and said cover frame member being movable to an open position to permit reception of said carton on said bottom support member, said cover frame member being thereafter movable into engagement with said open-end of the carton, a plurality of anvils on said cover frame member, one for each corner of the open end of said carton, a stretcher on said cover frame member adjacent each of said anvils and movable with respect to its associated anvil, each of said anvils and its associated stretcher being positioned on the outside and the inside respectively of a corner of said open end when said cover frame member engages said open end, coupling means on said cover frame member, and operating means connecting said stretchers to each other and to said coupling means, said resilient clamping member being movable into engagement with said coupling means when said cover frame member is in engagement with said open end to clamp said carton between said bottom support member and said cover frame member and to cause said stretchers to move said corners toward said anvils thereby stretching and squaring the clamped carton, said apparatus and the clamped squared carton carried thereby being movable on said common pivot from the carton-receiving position to a carton-unloading position.

5. Apparatus for receiving and squaring a box-like carton having an open end while such apparatus is in a carton-receiving position, said apparatus comprising a frame, a bottom support member for receiving and supporting said carton with its open end opposite to such bottom support member, a side member and a resilient clamping member pivoted on said bottom support member, a cover frame member having a common pivot with said side member on said frame, said side member and said resilient clamping member and said cover frame member being movable to an open position to permit reception of said carton on said bottom support member, said cover frame member being thereafter movable into engagement with said open-end of the carton, a plurality of anvils on said cover frame member, one for each corner of the open end of said carton, a stretcher on said cover frame member adjacent each of said anvils and movable with respect to its associated anvil, each of said anvils and its associated stretcher being positioned on the outside and the inside respectively of a corner of said open end when said cover frame member engages said open end, coupling means on said cover frame member, and operating means connecting said stretchers to each other and to said coupling means, said resilient clamping member being movable into engagement with said coupling means when said cover frame member is in engagement with said open end to clamp said carton between said bottom support member and said cover frame member and to cause said stretchers to move said corners toward said anvils thereby stretching and squaring the clamped carton, said apparatus and the clamped squared carton carried thereby being movable on said common pivot from the carton-receiving position to a carton-unloading position, and a slide removable from said cover frame member to permit unloading of said clamped squared carton.

6. Apparatus for receiving and squaring a box-like carton having an open end while such apparatus is in a carton-receiving position, said apparatus comprising a frame, a bottom support member for receiving and supporting said carton with its open end opposite to such bottom support member, a side member and a resilient clamping member pivoted on said bottom support member, a cover frame member having a common pivot with said side member on said frame, said side member and said resilient clamping member and said cover frame member being movable to an open position to permit reception of said carton on said bottom support member, said cover frame member being thereafter movable into engagement with said open-end of the carton, a plurality of anvils on said cover frame member, one for each corner of the open end of said carton, a stretcher on said cover frame member adjacent each of said anvils and movable with respect to its associated anvil, each of said anvils and its associated stretcher being positioned on the outside and the inside respectively of a corner of said open end when said cover frame member engages said open end, coupling means on said cover frame member, biasing means connected to said stretchers for biasing said stretchers away from said anvils, operating means connecting said stretchers to each other and to said coupling means, said resilient clamping member being movable into engagement with said coupling means when said cover frame member is in engagement with said open end to clamp said carton between said bottom support member and said cover frame member and to cause said stretchers to move said corners toward said anvils against the action of said biasing means thereby stretching and squaring the clamped carton, locking means on said resilient clamping member for locking the latter in the clamping position, said apparatus and the clamped squared carton carried thereby being movable on said common pivot from the carton-receiving position to a carton-unloading position, and a slide removable from said cover frame member to permit unloading of said clamped squared carton.

References Cited in the file of this patent

UNITED STATES PATENTS

| | | |
|---|---|---|
| 316,329 | Brush | Apr. 21, 1885 |
| 1,008,651 | Korff | Nov. 14, 1911 |
| 1,421,868 | Volkmere | July 4, 1922 |
| 1,655,134 | Clisson | Jan. 3, 1928 |
| 1,851,972 | Blauvelt | Apr. 5, 1932 |
| 2,530,333 | Jost | Nov. 14, 1950 |
| 2,652,140 | Hall | Sept. 15, 1953 |